US012811358B2

(12) United States Patent
Romano et al.

(10) Patent No.: US 12,811,358 B2
(45) Date of Patent: Nov. 24, 2026

(54) FIBRE LASER ASSEMBLY AND METHOD FOR GENERATING HIGH POWER LASER RADIATION

(71) Applicants: Fraunhofer-Gesellschaft zur Förderung der angewandten Forschung e.V., Munich (DE); Karlsruher Institut für Technologie, Karlsruhe (DE)

(72) Inventors: Clément Romano, Ettlingen (DE); Christelle Kieleck, Ettlingen (DE); Marc Eichhorn, Ettlingen (DE)

(73) Assignees: FRAUNHOFER-GESELLSCHAFT ZUR FORDERUNG DER ANGEWANDTEN FORSCHUNG E.V., Munich (DE); KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 530 days.

(21) Appl. No.: 18/276,669

(22) PCT Filed: Feb. 1, 2022

(86) PCT No.: PCT/EP2022/052302
§ 371 (c)(1),
(2) Date: Aug. 10, 2023

(87) PCT Pub. No.: WO2022/171487
PCT Pub. Date: Aug. 18, 2022

(65) Prior Publication Data

US 2024/0039232 A1 Feb. 1, 2024

(30) Foreign Application Priority Data

Feb. 11, 2021 (DE) .................... 10 2021 103 243.1

(51) Int. Cl.
*H01S 3/094* (2006.01)
*H01S 3/067* (2006.01)

(52) U.S. Cl.
CPC ...... *H01S 3/094003* (2013.01); *H01S 3/0675* (2013.01); *H01S 3/06762* (2013.01)

(58) Field of Classification Search
CPC ................................................ H01S 3/094003
See application file for complete search history.

(56) References Cited

U.S. PATENT DOCUMENTS 6,233,092 B1 5/2001 Flood et al.
6,507,430 B2 * 1/2003 Yenjay ................ H01S 3/06754
359/341.32

(Continued)

OTHER PUBLICATIONS

Li et al., "Thulium-doped Fiber Amplifier for Optical Communications at 2μm", OFC/NFOEC Technical Digest, 2013, 3 pages.

(Continued)

*Primary Examiner* — Deandra M Hughes
(74) *Attorney, Agent, or Firm* — XSENSUS LLP

(57) ABSTRACT

A fibre laser assembly includes a pump laser assembly for optical pumping of an active fibre with first pump radiation of a first pump wavelength and means for the generation of second pump radiation at a second pump wavelength, which lies between the first pump wavelength and the wavelength of the seed laser. Doping concentration, length of the active fibre, and power of the first pump radiation are coordinated such that the active fibre absorbs the first pump radiation in the first fibre portion to >90%, the radiation of the second pump wavelength in the first fibre portion is amplified by the first pump radiation to generate the second pump radiation, and the laser radiation of the seed laser is amplified in the remaining second fibre portion by the second pump radiation.

19 Claims, 2 Drawing Sheets

(56) References Cited

U.S. PATENT DOCUMENTS

| | | | | |
|---|---|---|---|---|
| 6,606,190 | B2 * | 8/2003 | Lee | H01S 3/06758 359/337 |
| 6,972,897 | B2 * | 12/2005 | Song | H01S 3/06758 359/349 |
| 7,027,218 | B2 * | 4/2006 | Hwang | H01S 3/094003 359/341.32 |
| 7,136,219 | B2 * | 11/2006 | Shimizu | H01S 3/13013 359/337.4 |
| 7,876,497 | B2 * | 1/2011 | Desbiens | H01S 3/06754 359/341.32 |
| 2002/0118445 | A1 | 8/2002 | Yeniay et al. | |
| 2018/0159296 | A1 | 6/2018 | Johnson et al. | |
| 2018/0261969 | A1 * | 9/2018 | Augst | H01S 3/10023 |
| 2024/0039232 | A1 * | 2/2024 | Romano | H01S 3/1616 |

OTHER PUBLICATIONS

Heidt et al., "100 kW peak power picosecond thulium-doped fiber amplifier system seeded by a gain-switched diode laser at 2 µm", Optics Letiers, vol. 38, No. 10, May 15, 2013, pp. 1615-1617.

Heidt et al., "35 kW Peak Power Picosecond Pulsed Thulium-doped Fibre Amplifier System Seeded by a Gain-Switched Laser Diode at 2 µm", IEEE, 2013, 1 page.

Alam et al. "Thulium Doped Fiber Amplifiers for 2 µm Telecommunications", 2013 18th OptoElectronics and Communications Conference held jointly with 2013 International Conference on Photonics in Switching, Jun. 30, 2013, 2 pages.

International Search Report and Written Opinion mailed on Jun. 9, 2022, received for PCT Application PCT/EP2022/052302, filed on Feb. 1, 2022, 14 pages including English Translation.

* cited by examiner

FIBRE LASER ASSEMBLY AND METHOD FOR GENERATING HIGH POWER LASER RADIATION

CROSS-REFERENCE TO RELATED APPLICATIONS

The present application is based on PCT filing PCT/EP2022/052302, filed Feb. 1, 2022, which claims priority from DE 10 2021 103 243.1, filed Feb. 11, 2021, the entire contents of each are incorporated herein by reference.

TECHNICAL FIELD OF APPLICATION

The present invention relates to a fibre laser assembly with at least one seed laser, which emits laser radiation at a wavelength to be amplified, a pump laser assembly, and a doped active fibre, in which the laser radiation of the seed laser can be amplified by optical pumping of the active fibre. The invention also relates to a method for the amplification of laser radiation in a doped active fibre.

For applications in the field of data transmission by way of optical fibre networks, for example in coherent data communication with lasers, as well as in the field of laser weapons, and for material processing with lasers of high laser powers in the range from 10 kW to >100 kW, beam sources of good beam quality are required. In particular, for the generation of radiation with a low eye hazard, an emission at a wavelength of about 2.1 μm with good atmospheric transmission is advantageous. Fibre lasers, in particular with holmium (Ho—) or Tm-doped active fibres, are particularly suitable for this purpose. However, the invention that is described in what follows can also be used in general terms for other actively doped fibre lasers.

While the efficiency of fibre lasers is generally good over a wide range around the amplification maximum, an undesirably high amplified spontaneous emission (ASE) occurs in these fibre lasers, if the laser is forced to a long wavelength located away from the amplification maximum. For this reason, Ho-doped active fibres have so far been used instead of Tm-doped fibres to generate laser radiation in the region of a wavelength of around 2.1 μm. However, the overall efficiency of the fibre laser assembly thereby becomes worse, and the assembly becomes more complex.

PRESENTATION OF THE INVENTION

The object of the present invention is to specify a fibre laser assembly and a method for the generation, or amplification, of laser radiation with a fibre laser at a wavelength at the long wavelength end of the amplification range, which have a high overall efficiency in particular for Tm-doped fibre lasers at a wavelength >2.02 μm.

The object is achieved with the fibre laser assembly and the method according to the patent claims 1 and 15. Advantageous configurations of the method and the fibre laser assembly are the subject matter of the dependent patent claims, or can be taken from the following description, together with the examples of embodiment.

The proposed fibre laser assembly comprises at least one doped active fibre, a pump laser assembly for the optically pumping of the active fibre with a first pump radiation at a first pump wavelength, and a seed laser that emits laser radiation at a seed wavelength, preferably of >2 μm, which is coupled into the active fibre. In accordance with the present invention, the fibre laser assembly further comprises a device for the generation of a second pump radiation, which is guided in the core of the active fibre, and has a second pump wavelength, which lies between the first pump wavelength and the wavelength of the seed laser. Here the active fibre has a first fibre portion, and a second fibre portion adjoining the first fibre portion, wherein the laser radiation of the seed laser is coupled into the active fibre at the end of the active fibre at which the first fibre portion begins. The doping concentration of the active fibre, the power of the first pump laser assembly, and the length of the active fibre, are here adapted to each other such that the active fibre absorbs >90% of the first pump radiation in the first fibre portion of the active fibre. The radiation at the second pump wavelength, which propagates in the first fibre portion in the direction of the second fibre portion, is amplified in the first fibre portion by the first pump radiation so as to generate the second pump radiation, and the laser radiation of the seed laser is amplified in the remaining second fibre portion of the active fibre by the second pump radiation.

In what follows, the proposed fibre laser assembly and the proposed method are explained primarily on the basis of a fibre laser with an active fibre doped with thulium, and a (seed) wavelength of >2 μm that is to be amplified. However, the fibre laser assembly and the method can be used in the same manner for other seed wavelengths and fibre lasers, in which the active fibre is doped with other elements. The pump wavelengths are then—if necessary—adapted accordingly. The effective cross-sections of Tm-doped active fibres are very small at wavelengths >2 μm, which means that the saturation power level for the fibre is high. Although the active fibre is here preferably pumped via the cladding in the region of 793 nm as the first pump wavelength, the inversion is still too high (optimum amplification band is 1,900 to 2,050 nm). A high seed power is therefore also required for a saturation of the amplifier and a high efficiency >2.02 μm. With the proposed configuration of the fibre laser assembly, the ASE occurring, for example, in Tm-doped active fibres, is utilised in the first fibre portion of the active fibre to generate, or amplify, the second pump radiation at the intermediate wavelength (second pump wavelength). The laser radiation of the seed laser experiences only a slight amplification in this first fibre portion. By the amplification of the second pump radiation in the first fibre portion, and the propagation of the second pump radiation into the second fibre portion, the second fibre portion is pumped by the second pump radiation, so that the seed laser radiation in this second fibre portion is efficiently amplified at the wavelength of >2.02 μm.

In the proposed fibre laser assembly and the associated method, at least three different optical signals are deployed: a first pump laser signal at the first pump wavelength $\lambda_{p1}$, one or a plurality of second pump signals, also referred to as intermediate pump signals by virtue of the position of their wavelength, at wavelengths $\lambda_{p2}$, $\lambda_{p3}$, $\lambda_{p4}$, . . . , and a seed signal at a wavelength of $\lambda_s$. The amplification medium, for example, the thulium-doped active optical fibre, can be divided into two portions, a first fibre portion that is optically pumped by the first pump radiation, that is to say, the first pump signal, and delivers amplification for the intermediate pump signal(s), and a second fibre portion that is optically pumped by the intermediate pump signal(s), that is to say, the second pump radiation, and delivers amplification for the seed signal. In this fibre laser assembly, the second pump radiation is implicitly generated by way of the amplification medium, that is to say, the first fibre portion of the active fibre, and is not coupled into the active fibre by way of a coupler.

In an advantageous configuration of the proposed fibre laser assembly and the associated method, the second pump radiation is generated from the ASE of the first fibre portion of the active fibre, and is amplified by the latter by means of optical pumping with the first pump radiation. For this purpose, the fibre laser assembly has a first fibre Bragg grating, which is highly reflective at the second pump wavelength, preferably with a reflectivity >90%, particularly preferably >95%, and reflects the radiation emerging from the active fibre in the direction of the seed laser at this wavelength, back into the active fibre. By virtue of this back reflection of the component of the ASE at the second pump wavelength, this component is amplified when passing through the first fibre portion, and then serves in the second fibre portion as pump radiation for the laser radiation of the seed laser at, for example, >2.02 μm. The first fibre Bragg grating is here designed in a passive fibre connected to the input end of the active fibre, or directly at the input end of the active fibre.

In a further development of this latter configuration, one or a plurality of further fibre Bragg gratings can also be formed in the passive fibre, or also in the first fibre portion of the active fibre; these are highly reflective at another wavelength that lies between the wavelength of the seed laser and the first pump wavelength. In this manner, second pump radiation can also be generated at one or a plurality of further pump wavelengths, in the same manner as at the second pump wavelength.

In a further configuration of the proposed fibre laser assembly, in addition to the first fibre Bragg grating, which is designed to be highly reflective at the second pump wavelength, a second fibre Bragg grating is arranged at the end of the first portion of the active fibre, which, together with the first fibre Bragg grating, forms a resonator for the laser radiation at the second pump wavelength. This second fibre Bragg grating also serves as a decoupling mirror at the second pump wavelength towards the second fibre portion, that is to say, it is partially transparent at this second pump wavelength. With this configuration, the second pump radiation can be generated by the laser activity with a higher intensity and efficiency.

Between the seed laser and the input of the, for example, Tm-doped active fibre, one or a plurality of amplifiers, in particular amplification fibres, can be arranged; these amplify the seed laser signal before it passes through the Tm-doped active fibre. An Ho-doped amplification fibre is particularly suitable here. In the same manner, an additional amplifier (or a plurality of amplifiers) can be arranged behind the Tm-doped active fibre; this is preferably an Ho-doped active fibre. The latter fibre can then also be pumped with the second pump radiation that has not been completely absorbed by the second fibre portion of the active fibre, and then enters into the Ho-doped fibre.

In an advantageous configuration, an Ho-doped amplification fibre is inserted between the seed laser and the active fibre so as to amplify the laser radiation of the seed laser, which is pumped by the laser radiation of a Tm-doped fibre laser at the second pump wavelength. This radiation from the fibre laser is coupled into the core of the amplification fibre.

The doping and length of the amplification fibre and the power of the fibre laser, which in this case is preferably Tm-doped, are adapted to each other such that a part of this coupled-in laser radiation is not absorbed in the amplification fibre. This non-absorbed component then enters the Tm-doped active fibre together with the amplified laser radiation of the seed laser, and is again amplified there in the first fibre portion, so as to generate the second pump radiation.

The pump laser assembly for the generation of the first pump radiation is preferably formed by one or a plurality of laser diodes, which pump the active fibre, doped, for example, with Tm, via the cladding. The pumping with the first pump radiation is preferably performed at a wavelength in a range from 780 nm to 810 nm, for example, at about 793 nm. The second pump wavelength of the second pump radiation preferably lies in a range from 1,900 nm to 1,980 nm, for example at 1,900 nm, or at 1,950 nm.

In another configuration, an Er:Yb-laser is utilised as the first pump laser assembly; this emits laser radiation in a range from 1,520 nm to 1,590 nm, for example at a wavelength of 1,560 nm, as the first pump wavelength. This laser radiation is then preferably coupled into the core of the active, for example, Tm-doped, fibre, for purposes of optical pumping.

In the proposed fibre laser assembly and the associated method, a better inversion distribution is achieved in the Tm-doped fibre by the utilisation of intermediate radiation at a higher wavelength (second pump radiation) to pump the main amplifier portion, that is to say, the second fibre portion, so that long wavelengths >2,070 nm can also be amplified efficiently, and with a better efficiency than in a pure Ho-fibre amplifier. The proposed fibre laser assembly and the associated method can be used primarily for laser sources for laser material processing, for optronic countermeasures and laser weapons, as well as for data transmission.

BRIEF DESCRIPTION OF THE FIGURES

In what follows the proposed fibre laser assembly and the associated method are explained in more detail by means of examples of embodiment in conjunction with the figures. Here.

PATHS TO THE EMBODIMENT OF THE INVENTION

In the proposed fibre laser assembly and the associated method, the laser radiation at the second pump wavelength, which is amplified in the first fibre portion to form the second pump radiation, can either be obtained from the ASE in the first fibre portion, or supplied from another laser source via the core of the active fibre. In the following examples of embodiment of FIGS. 1 to 4, the first case is exemplified, in the examples of embodiment of FIGS. 5 and 6, the second case is exemplified.

Figure 1:
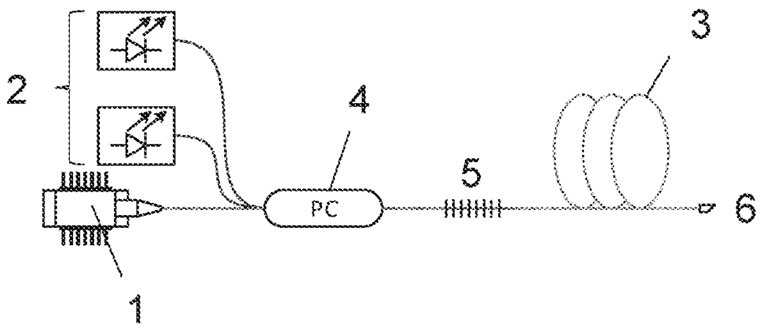
FIG. 1 shows a schematic representation of a first example of embodiment of the proposed fibre laser assembly.

Thus FIG. 1 shows an exemplary configuration of the proposed fibre laser assembly, in which the laser radiation of a seed laser 1, with a wavelength of >2.02 μm, is supplied to a Tm-doped active fibre 3. The active fibre 3 is optically pumped via the fibre cladding, by way of a pump laser assembly 2, which in the present case consists of two multi-mode laser diodes. The coupling-in of this first pump radiation takes place by way of the pump coupler 4, as shown in the figure. The doping concentration and length of the active fibre 3 are designed such that >90% of the pump radiation of the pump laser assembly 2 is absorbed in a first portion of this fibre 3. A passive fibre is arranged between the output of the seed laser 1 and the input of the active fibre 3, in which a fibre Bragg grating 5 (first fibre Bragg grating) is designed, which is highly reflective at a second pump wavelength. The passive fibre can here be spliced onto the active fibre 3. The pump coupler 4 is arranged on this passive fibre. In this example, the laser diodes of the pump laser assembly 2 emit pump radiation at a wavelength of 793 nm (first pump radiation), at which Tm-doped fibres can be pumped particularly effectively. The fibre Bragg grating 5 is chosen so as to be highly reflective at a wavelength that lies within the optimal amplification band of thulium, in this example 1,950 nm. By the arrangement of this fibre Bragg grating 5, which is highly reflective at the second pump wavelength of 1,950 nm, close to the input end of the active fibre 3, parasitic lasing, or unidirectional spontaneous amplified emission, is achieved at this wavelength, causing amplification of the laser radiation at the second pump wavelength. This amplified signal serves as a second pump radiation that optically pumps the active fibre 3 in the adjoining second fibre portion. No (first) pump radiation at the first pump wavelength any longer reaches this second fibre portion. In this second fibre portion the active fibre 3 is pumped exclusively by the (second) pump radiation at the second pump wavelength of 1,950 nm, and here causes the amplification of the laser radiation of the seed laser that is propagating in the active fibre 3 at a wavelength of >2.02 μm.

Figure 2:
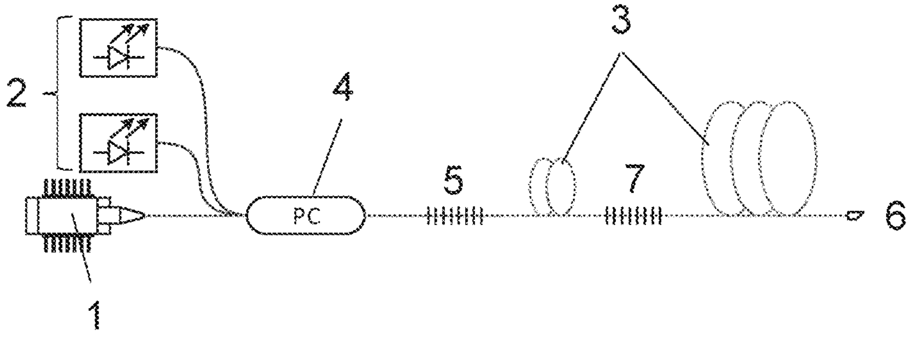
FIG. 2 shows a schematic representation of a second example of embodiment of the proposed fibre laser assembly.

In a second exemplary configuration of the proposed fibre laser assembly, as shown in FIG. 2, a second fibre Bragg grating 7 is arranged, that is to say, designed in the first portion of the active fibre 3, preferably at the end of this first portion, in addition to the high-reflective fibre Bragg grating 5. This second fibre Bragg grating 7 is designed such that it forms a resonator with the first fibre Bragg grating 5 at the second pump wavelength, here 1,950 nm, and at the same time forms the decoupling mirror of this resonator for this second pump wavelength.

Figure 3:
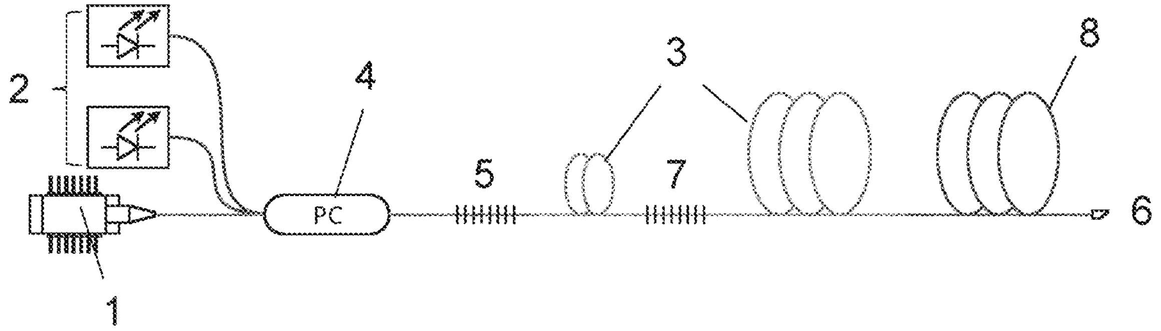
FIG. 3 shows a schematic representation of a third example of embodiment of the proposed fibre laser assembly.

FIG. 3 shows a third example of embodiment of the proposed fibre laser assembly, in which, in addition to the configuration of FIG. 2, a further Ho-doped active fibre 8 is spliced onto the output of the Tm-doped active fibre 3. This further active fibre 8 is optically pumped by a component of the (second) pump radiation at the second pump wavelength, which has not been absorbed in the Tm-doped active fibre 3. In this assembly, the desired laser signal at >2.02 μm is further amplified by the Ho-doped active fibre 8.

Figure 4:
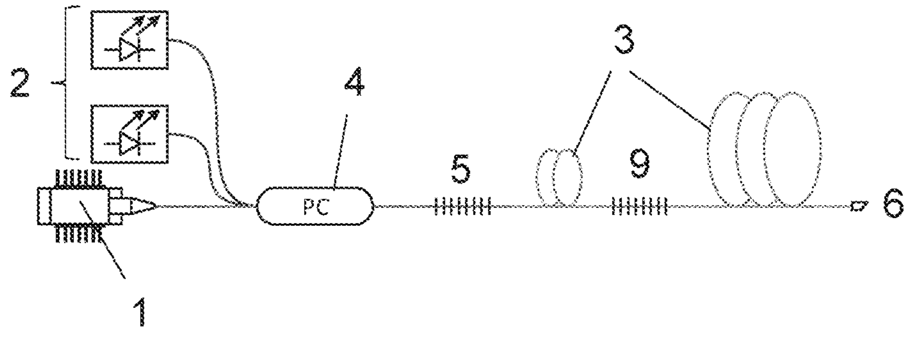
FIG. 4 shows a schematic representation of a fourth example of embodiment of the proposed fibre laser assembly.

In another exemplary configuration of the proposed fibre laser assembly, as shown in FIG. 4, the second pump radiation is generated with two different pump wavelengths. For this purpose, in addition to the first high-reflectivity fibre Bragg grating of FIG. 1, a further (third) fibre Bragg grating 9 is inscribed into the first portion of the active fibre 3, which is designed to be highly reflective for a pump wavelength $\lambda_{p3}$ that differs from that of the first fibre Bragg grating 5. The two fibre Bragg gratings 5, 9 thus have different central wavelengths $\lambda_{p2}$, $\lambda_{p3}$, where $\lambda_{p3}>\lambda_{p2}$, so that in a first region of the first portion of the active fibre 3 (as far as the further fibre Bragg grating 9) the first intermediate pump signal (at $\lambda_{p2}$) and in a second region of the first portion of the active fibre 3 adjoining the further fibre Bragg grating 9 the second intermediate pump signal (at $\lambda_{p3}$) is amplified. Both pump signals then propagate into the second portion of the active fibre 3 and there amplify the seed laser signal at $\lambda_{pS}>2.02$ μm. For both intermediate pump signals, a corresponding resonator can also be generated by an appropriate arrangement of other low-reflectivity fibre Bragg gratings, as described in FIG. 2. The other low-reflectivity fibre Bragg grating for the first intermediate pump signal can here be formed either before, after, or also within, the other high-reflectivity fibre Bragg grating 9.

Figure 5:
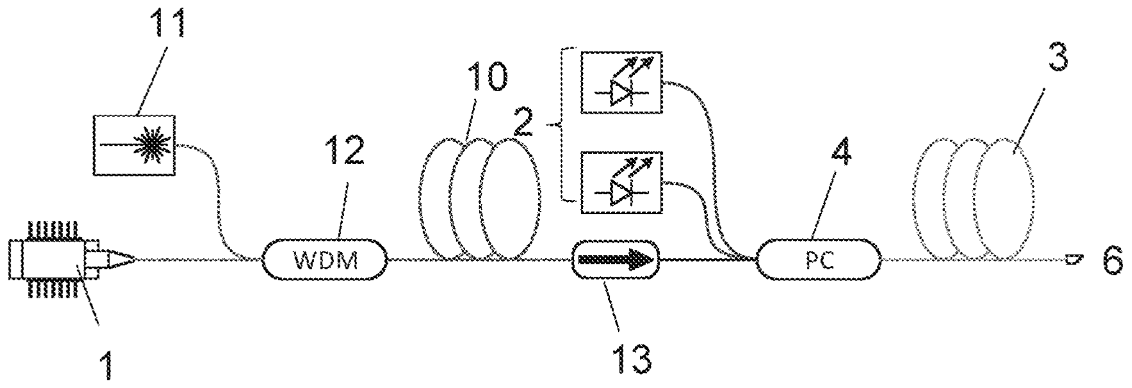
FIG. 5 shows a schematic representation of a fifth example of embodiment of the proposed fibre laser assembly.

FIG. 5 shows an example of embodiment in which the laser radiation of the seed laser 1 is firstly preamplified in a holmium-doped active fibre 10. In this example, this holmium-doped active fibre 10 is pumped via the core at a wavelength of 1,950 nm with a Tm-fibre laser 11. The pump laser signal is coupled into the core of the Ho-doped fibre 10 by way of a WDM (Wavelength Division Multiplexer) 12, as indicated in FIG. 5. To avoid feedback, an isolator 13 is also inserted in this example between the input of the Tm-doped active fibre 3 and the output of the Ho-doped active fibre 10. By utilising the wavelength of 1,950 nm of a Tm fibre laser 11 for the optical pumping of the Ho-doped active fibre 10 via the core, and the suitable dimensioning of this fibre 10, a remaining component of the laser radiation of the Tm-fibre laser 11 enters the Tm-doped active fibre 3, which in turn is amplified in the first portion of the Tm-doped active fibre 3 by the optical pumping with the first pump radiation, and is utilised in the second fibre portion as second pump radiation. The fibre portion between the Ho-doped fibre 10 and the pump coupler 4 for the first pump radiation can either be passively formed or doped with Tm and thus optically pumped by the remaining component of the laser radiation at 1,950 nm.

Figure 6:
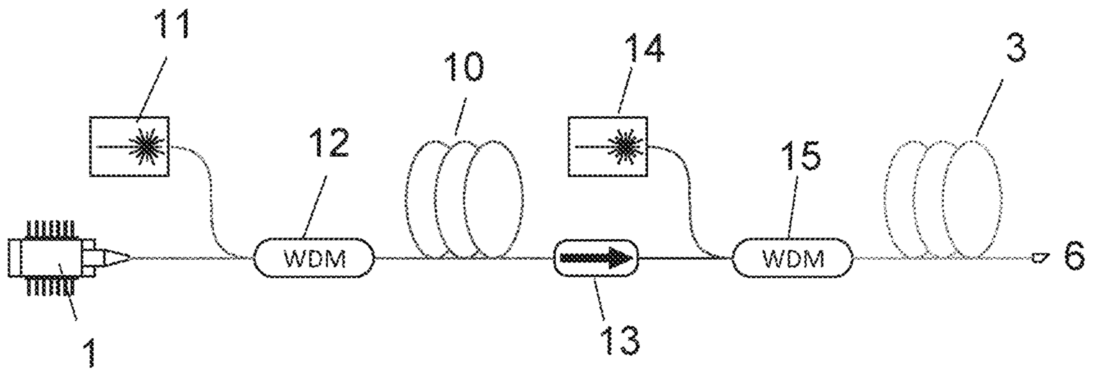
FIG. 6 shows a schematic representation of a sixth example of embodiment of the proposed fibre laser assembly.

A sixth example of embodiment of the proposed fibre laser assembly is shown in FIG. 6. This assembly is similar to the assembly in FIG. 5. In this example, the Ho-doped active fibre 10 (single-mode fibre) is optically pumped via the core with the Tm-fibre laser 11 at 1,900 nm. In this example, the optical pumping of the first fibre portion of the Tm-doped active fibre 3 with the first pump radiation is not performed via the cladding with laser diodes at a wavelength of 793 nm, but rather via the core with an Er:Yb-laser 14 at a wavelength of 1,560 nm. The coupling of this pump radiation into the core is again carried out by way of a WDM 15.

LIST OF REFERENCE SYMBOLS

1 Seed laser
2 Pump laser assembly
3 Tm-doped active fibre
4 Pump coupler
5 First fibre Bragg grating (HR)
6 Output
7 Second fibre Bragg grating (LR)
8 Ho-doped active fibre
9 Third fibre Bragg grating (HR)
10 Ho-doped active fibre
11 Tm-doped fibre laser
12 WDM

13 Isolator
14 Er:Yb-laser
15 WDM

The invention claimed is:

1. Fibre laser assembly comprising:
a doped active fibre, which comprises a first fibre portion and a second fibre portion adjoining the first fibre portion,
a pump laser assembly for the optical pumping of the active fibre with first pump radiation at a first pump wavelength, and
a seed laser, which emits laser radiation at a wavelength above the spectral amplification maximum of the active fibre, which is coupled into the active fibre at one end of the active fibre where the first fibre portion begins, wherein
the fibre laser assembly comprises a device for the generation of second pump radiation, which is guided in the core of the active fibre, and has a second pump wavelength, which lies between the first pump wavelength and the wavelength of the seed laser, and
the doping concentration of the active fibre, the power of the first pump laser assembly, and the length of the active fibre are adapted such that the active fibre absorbs the first pump radiation in the first fibre portion of the active fibre by >90%, second pump radiation of the second pump wavelength, which propagates in the first fibre portion in the direction of the second fibre portion, is amplified in the first fibre portion by the first pump radiation so as to generate the second pump radiation, and the laser radiation of the seed laser is amplified by the second pump radiation in the remaining second fibre portion of the active fibre.

2. Fibre laser assembly according to claim 1, wherein
the device for the generation of second pump radiation comprises a first fibre Bragg grating, which is designed to be highly reflective at the second pump wavelength and is arranged in a passive fibre connected to an input end of the active fibre, or is arranged at the input end of the active fibre, so as to achieve an amplification of the radiation at the second pump wavelength from an ASE, evoked by the optical pumping of the active fibre with the first pump radiation, in the first fibre portion of the active fibre.

3. Fibre laser assembly according to claim 2, wherein
the device for the generation of second pump radiation additionally comprises a second fibre Bragg grating in the first fibre portion of the active fibre, which grating forms a resonator at the second pump wavelength with the first fibre Bragg grating, and enables the second pump radiation generated in the resonator to be decoupled from the resonator into the second fibre portion of the active fibre.

4. Fibre laser assembly according to claim 2, wherein
the device for the generation of second pump radiation additionally comprises at least a second fibre Bragg grating in the first fibre portion of the active fibre, which is designed to be highly reflective for a further pump wavelength lying between the first pump wavelength and the wavelength of the seed laser, so as to achieve also an amplification of radiation of the further pump wavelength from an ASE, evoked by the optical pumping of the active fibre with the first pump radiation, in the first fibre portion of the active fibre.

5. Fibre laser assembly according to claim 1, wherein
the active fibre is doped with thulium.

6. Fibre laser assembly according to claim 1, wherein
the second pump wavelength lies in a range from 1,900 nm to 1,980 nm.

7. Fibre laser assembly according to claim 1, wherein
a holmium-doped amplification fibre is arranged between the seed laser and the active fibre, for the amplification of the laser radiation of the seed laser.

8. Fibre laser assembly according to claim 7, wherein
the amplification fibre is pumped by laser radiation from a thulium-doped fibre laser at the second pump wavelength, which is coupled into the core of the amplification fibre, wherein
the doping concentration of the amplification fibre, the power of the fibre laser doped with thulium, and the length of the amplification fibre, are adapted to each other, such that a part of the laser radiation of the fibre laser doped with thulium, coupled into the core of the amplification fibre, is not absorbed in the amplification fibre, and enters into the active fibre.

9. Fibre laser assembly according to claim 1, wherein
the pump laser assembly is formed by one or a plurality of laser diodes.

10. Fibre laser assembly according to claim 1, wherein
the pump laser assembly emits laser radiation at a wavelength in a range from 780 nm to 810 nm as the first pump wavelength.

11. Fibre laser assembly according to claim 1, wherein
the pump laser assembly is formed by an Er: Yb-laser, which emits laser radiation at a wavelength in a range from 1,520 nm to 1,590 nm as the first pump wavelength.

12. Fibre laser assembly according to claim 11, wherein
the laser radiation of the Er: Yb-laser is coupled into the core of the active fibre.

13. Fibre laser assembly according to claim 1, wherein
the active fibre adjoins a further active fibre, which is doped with holmium and is pumped by a component of the second pump radiation, which has not been absorbed in the active fibre.

14. Fibre laser assembly according to claim 1, wherein
the seed laser emits laser radiation with a wavelength of >2.02 μm.

15. Method for the amplification of laser radiation in a doped active fibre, which comprises a first fibre portion, and a second fibre portion adjoining the first fibre portion, in which laser radiation from a seed laser with a wavelength above the spectral amplification maximum of the active fibre, is coupled into the active fibre at an end of the active fibre at which the first fibre portion begins, and is amplified by means of optical pumping, wherein
the first fibre portion of the active fibre is optically pumped with first pump radiation at a first pump wavelength, and the remaining second fibre portion of the active fibre is optically pumped with second pump radiation at at least a second pump wavelength, which lies between the first pump wavelength and the wavelength of the seed laser, and the doping concentration of the active fibre, the power of the first pump radiation, and the length of the active fibre, are chosen such that the active fibre absorbs >90% of the first pump radiation in the first fibre portion, second pump radiation of the second pump wavelength, which propagates in the first fibre portion in the direction of the second fibre portion, is amplified in the first fibre portion by the first pump radiation for the generation of the second pump radiation, and the laser radiation of the seed laser is then amplified in the second fibre portion by means of the second pump radiation.

16. Method according to claim 15, wherein the radiation of the second pump wavelength is obtained from an ASE, evoked by the optical pumping of the active fibre with the first pump radiation, in the first fibre portion of the active fibre, is reflected back into the active fibre by way of a fibre Bragg grating, which is highly reflective at the second pump wavelength, and is there amplified by means of the optical pumping with the first pump radiation in the first fibre portion of the active fibre.

17. Method according to claim 16, wherein the radiation of at least one further pump wavelength is obtained from the ASE, evoked by the optical pumping of the active fibre with the first pump radiation, in the first fibre portion of the active fibre, is reflected back into the active fibre by way of a fibre Bragg grating, which is highly reflective at the further pump wavelength, and is there amplified by means of the optical pumping with the first pump radiation, in the first fibre portion of the active fibre.

18. Method according to claim 15, wherein a holmium-doped amplification fibre is used between the seed laser and the active fibre for the amplification of the laser radiation of the seed laser, wherein the amplification fibre is pumped by means of laser radiation at the second pump wavelength of a fibre laser doped with thulium, which is coupled into the core of the amplification fibre, wherein the doping concentration of the amplification fibre, the power of the fibre laser doped with thulium, and the length of the amplification fibre, are selected such that a part of the laser radiation of the second pump wavelength coupled into the core of the amplification fibre is not absorbed in the amplification fibre, enters the active fibre and is there amplified by means of the optical pumping with the first pump radiation in the first fibre portion of the active fibre.

19. Method according to claim 15 for the amplification of laser radiation in an active fibre doped with thulium.

* * * * *